US007206991B2

(12) United States Patent
Chatterjee et al.

(10) Patent No.: US 7,206,991 B2
(45) Date of Patent: Apr. 17, 2007

(54) METHOD, APPARATUS AND PROGRAM FOR MIGRATING BETWEEN STRIPED STORAGE AND PARITY STRIPED STORAGE

(75) Inventors: Paresh Chatterjee, Fremont, CA (US); Basavaraj Gurupadappa Hallyal, Fremont, CA (US); Senthil Murugan Thangaraj, Fremont, CA (US); Narasimhulu Dharanikumar Kotte, Fremont, CA (US); Ramya Subramanian, Fremont, CA (US)

(73) Assignee: LSI Logic Corporation, Milpitas, CA (US)

( * ) Notice: Subject to any disclaimer, the term of this patent is extended or adjusted under 35 U.S.C. 154(b) by 600 days.

(21) Appl. No.: 10/685,987

(22) Filed: Oct. 15, 2003

(65) Prior Publication Data
US 2005/0086429 A1 Apr. 21, 2005

(51) Int. Cl.
*G11C 29/00* (2006.01)
(52) U.S. Cl. .................... 714/770; 714/6; 714/8
(58) Field of Classification Search ............... 714/6–7, 714/770; 711/114, 165
See application file for complete search history.

(56) References Cited

U.S. PATENT DOCUMENTS

| 6,516,425 | B1 * | 2/2003 | Belhadj et al. ............... 714/6 |
| 2003/0188097 | A1 * | 10/2003 | Holland et al. ............ 711/114 |
| 2003/0237019 | A1 * | 12/2003 | Kleiman et al. ............... 714/6 |

* cited by examiner

Primary Examiner—Guy J. Lamarre
(74) Attorney, Agent, or Firm—Yee & Associates P.C.

(57) ABSTRACT

A mechanism is provided for migration between stripe storage and redundant parity striped storage. When a disk is added to a disk array, the mechanism migrates from RAID 0 to RAID 5. For each row, the mechanism calculates parity for the row and, if the parity position is not the new drive, the mechanism writes the data from the parity position to the new drive and writes the parity to the parity stripe position. If a drive fails, the mechanism migrates back from RAID 5 to RAID 0. For each row, if the parity position is not the failed drive, reads the data from remaining drives, XORs the data stripes to get failed drive data, and writes the failed drive data to the parity position. If a read or write is received for the failed drive, the mechanism simply redirects the read or write to the parity position.

22 Claims, 11 Drawing Sheets

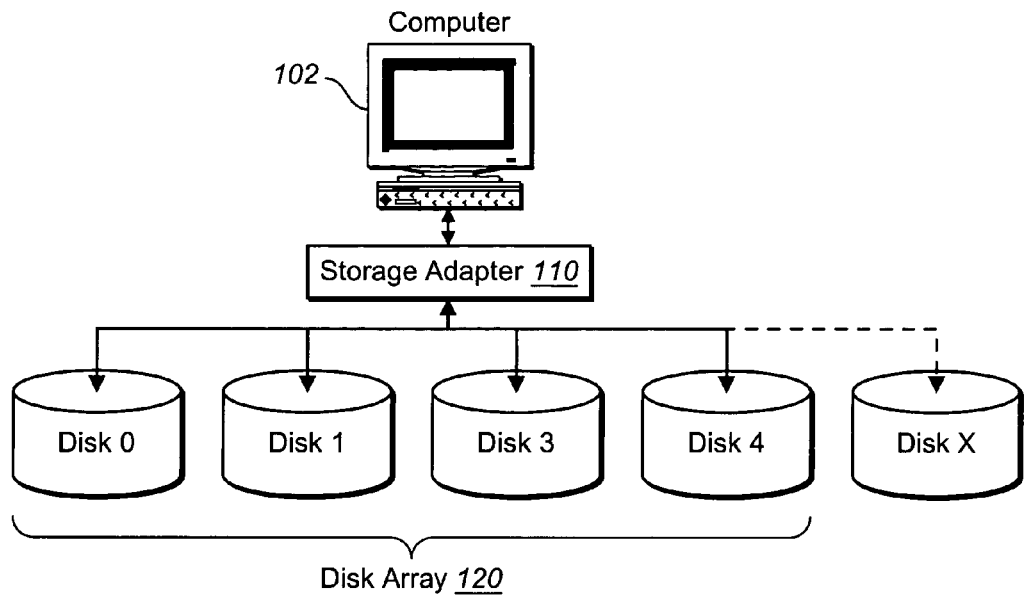
FIG._1
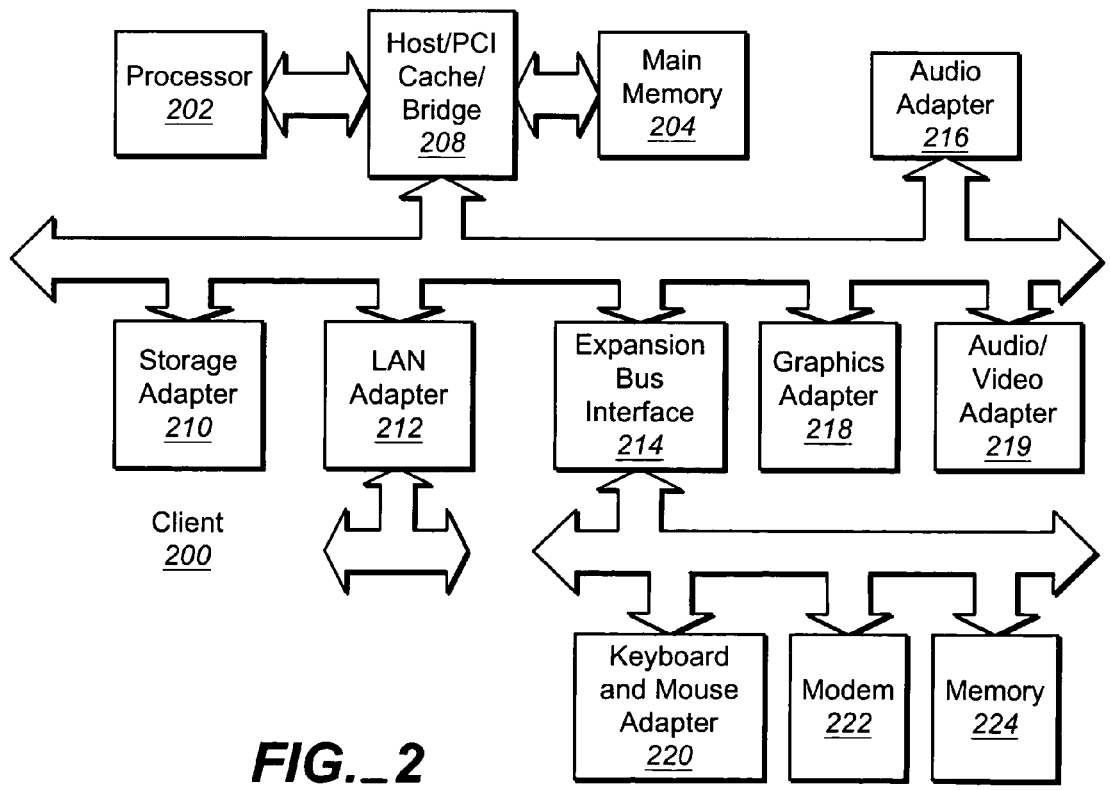
FIG._2

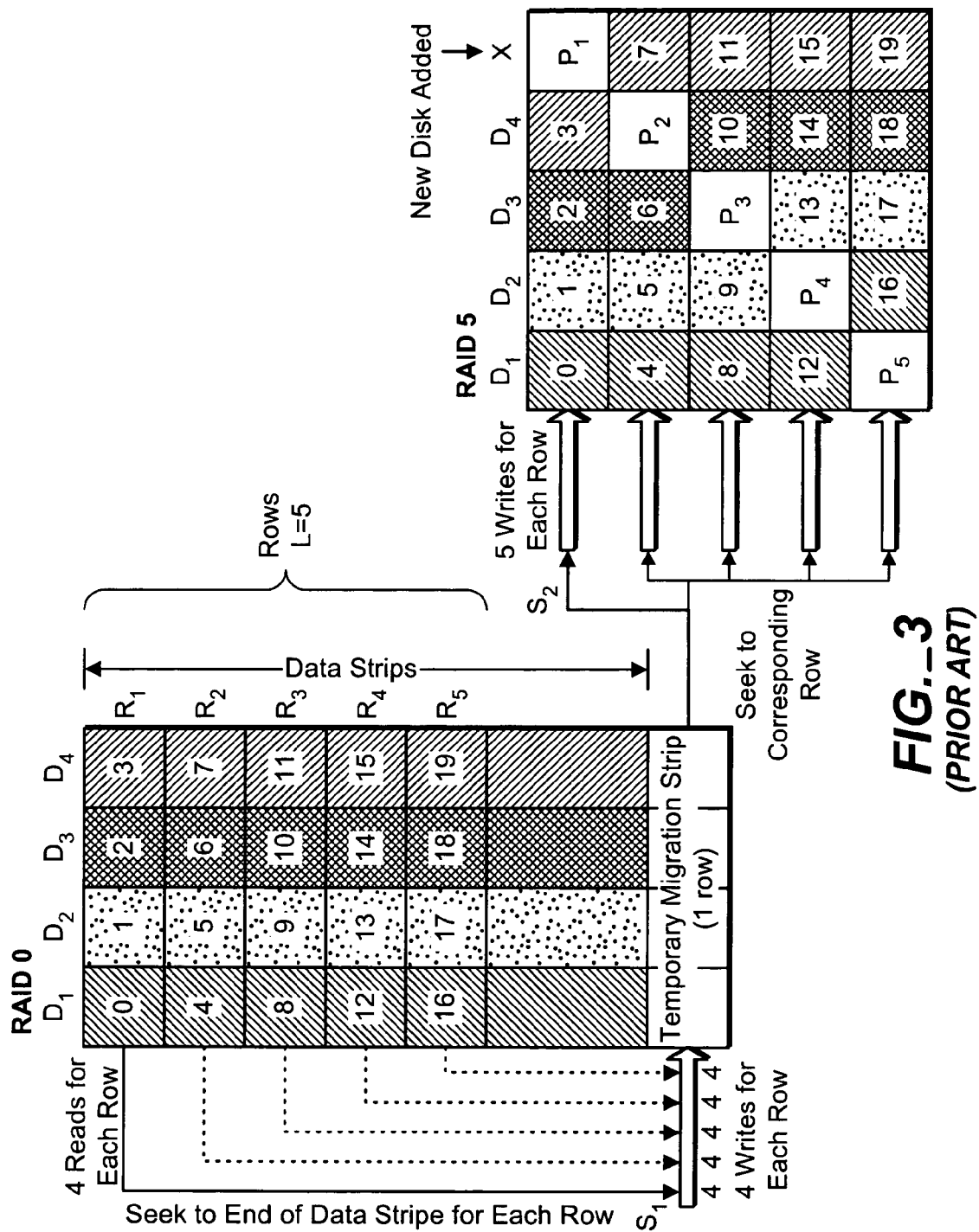
FIG._3 (PRIOR ART)

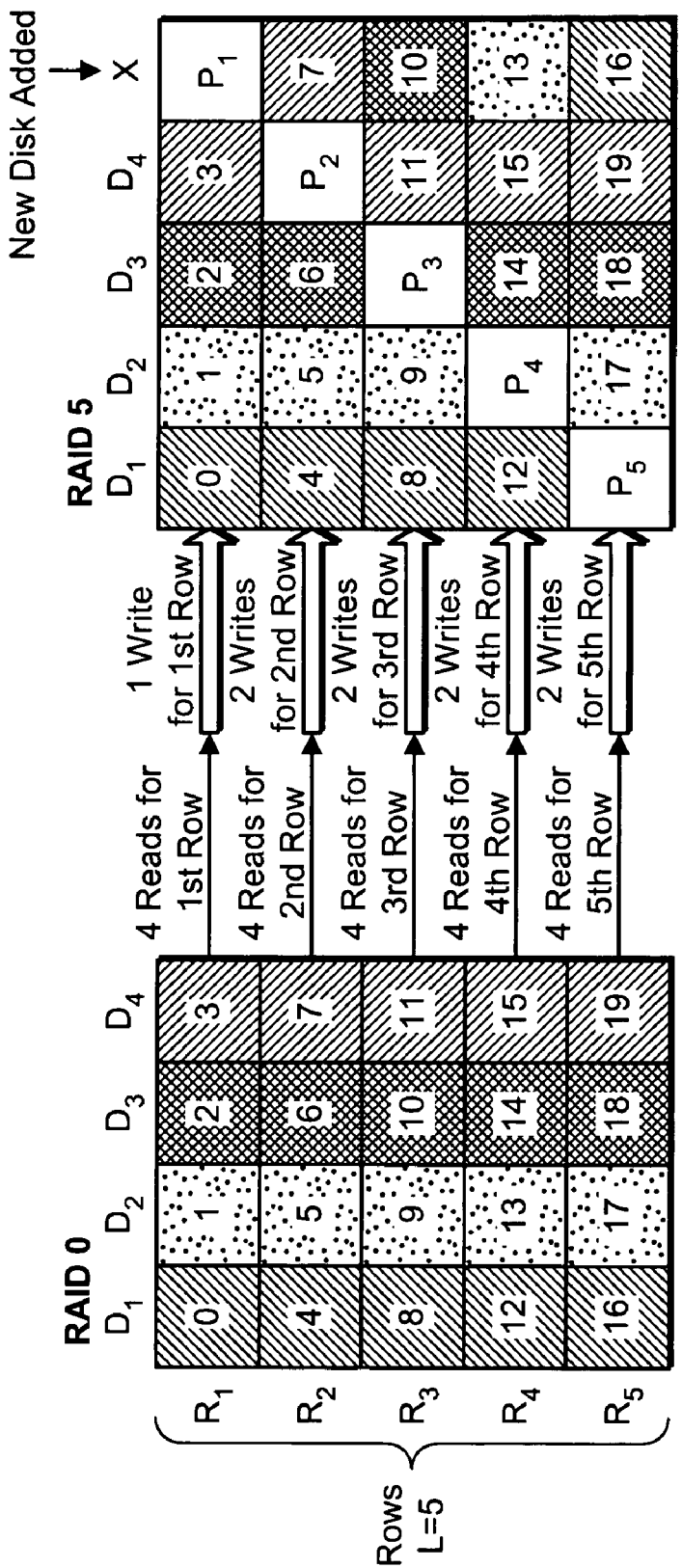
FIG._4

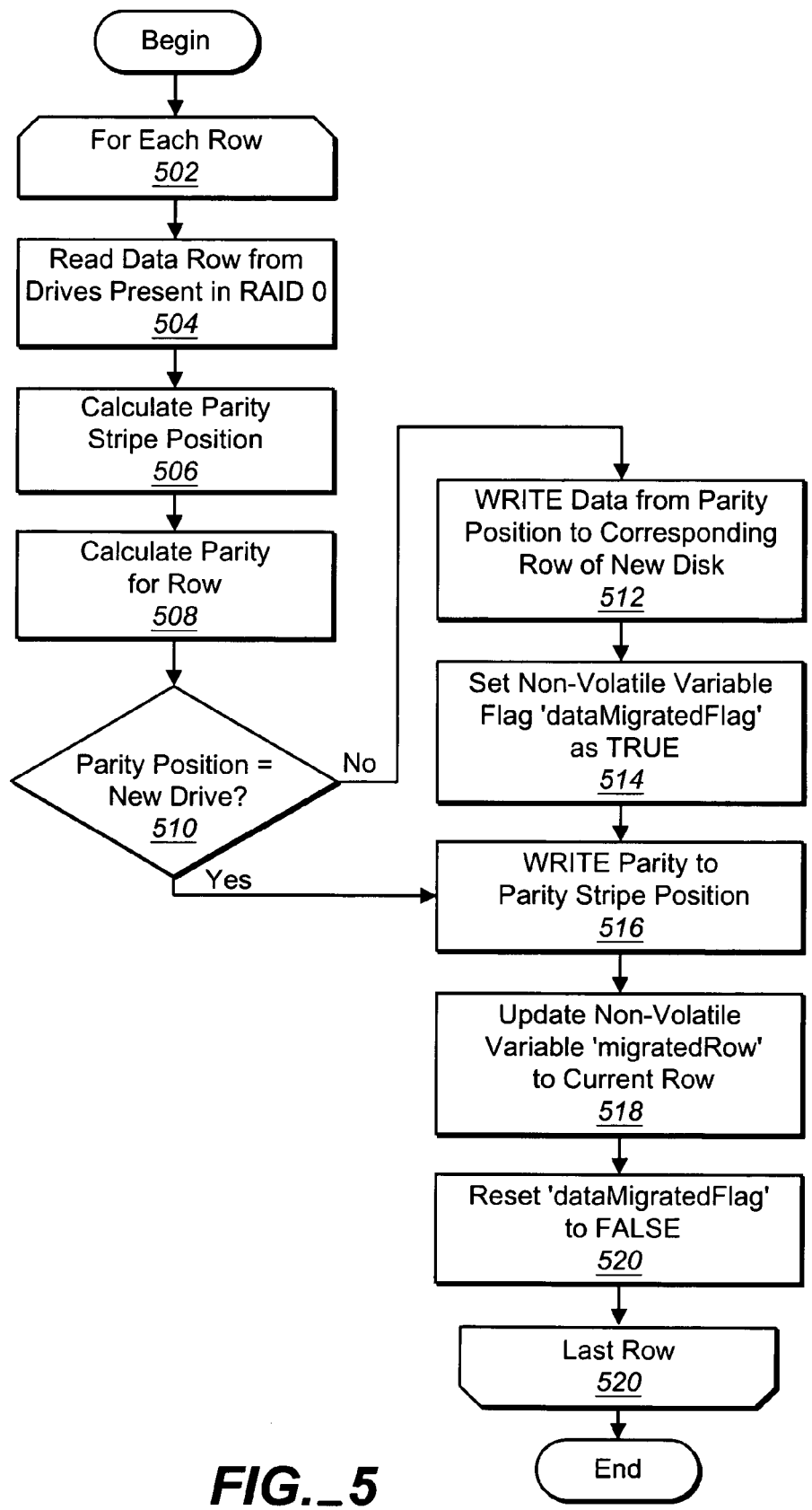
FIG._5

FIG._6A $(7) = 4 \oplus 5 \oplus 6 \oplus P_2$
$(10) = 8 \oplus 9 \oplus P_3 \oplus 11$
$(13) = 12 \oplus P_4 \oplus 14 \oplus 15$
$(16) = P_5 \oplus 17 \oplus 18 \oplus 19$

FIG._6B $(2) = 0 \oplus 1 \oplus 3 \oplus P_1$
$(6) = 4 \oplus 5 \oplus P_2 \oplus 7$
$(14) = 12 \oplus P_4 \oplus 15 \oplus 13$
$(18) = P_5 \oplus 17 \oplus 19 \oplus 16$

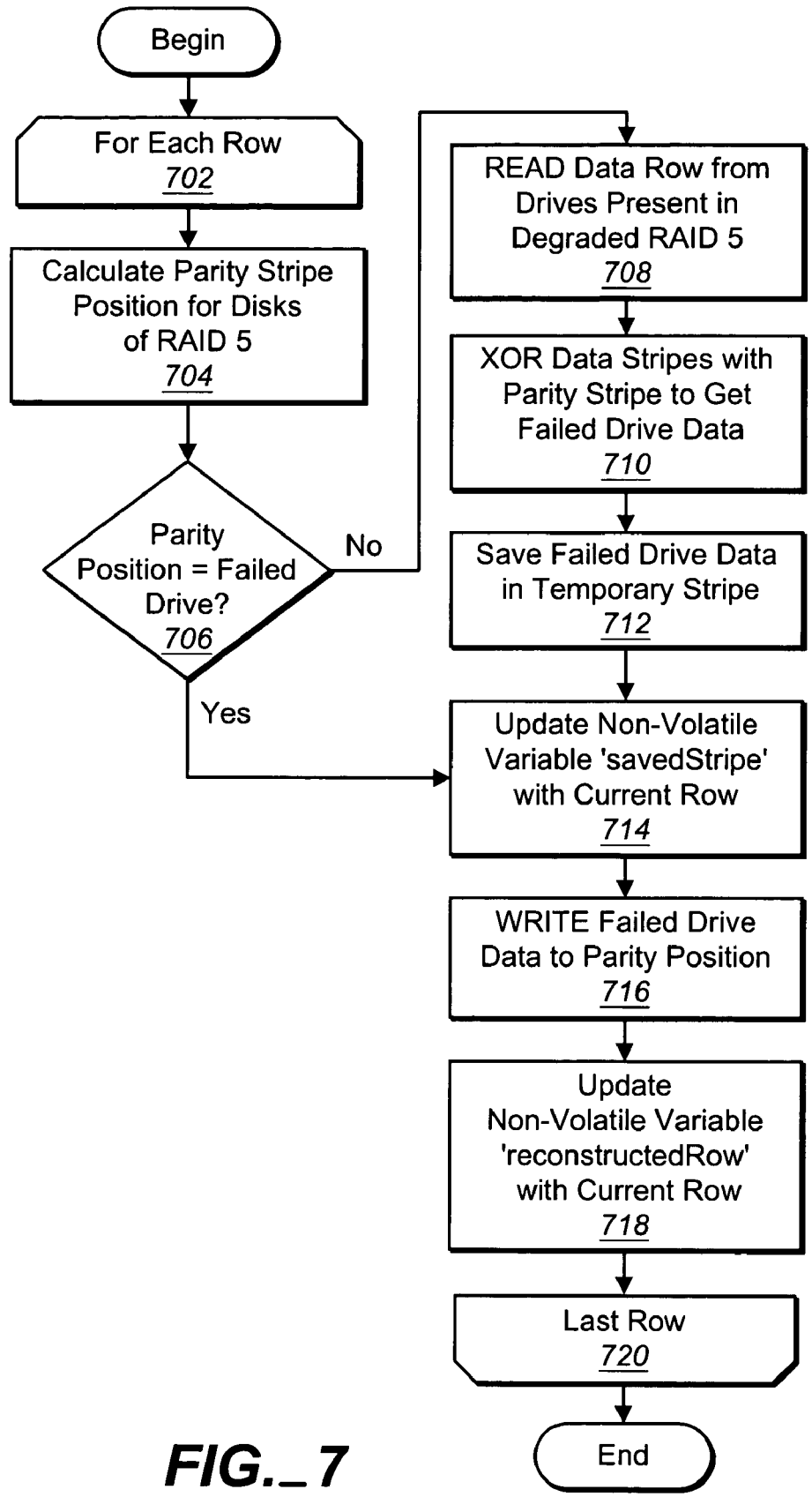
FIG._7

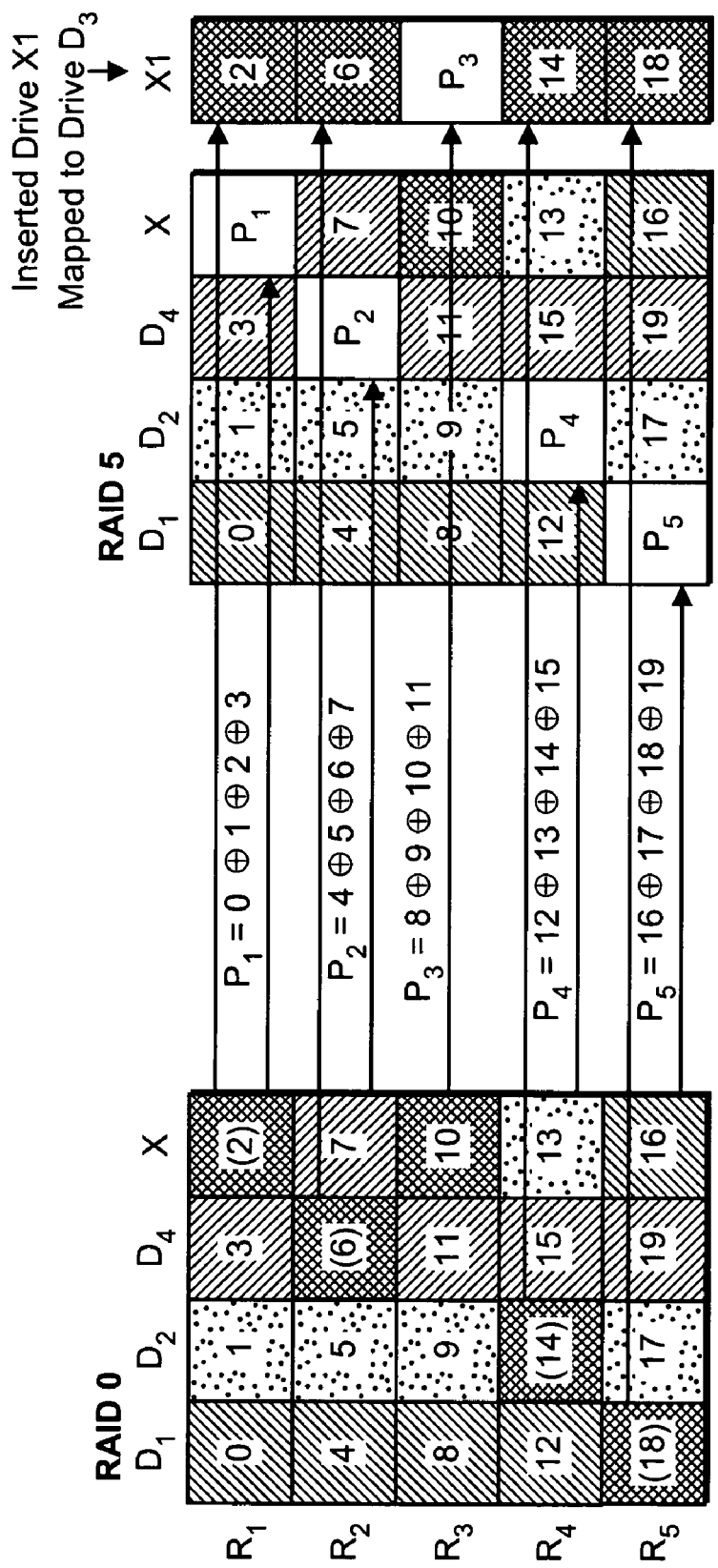
FIG._8

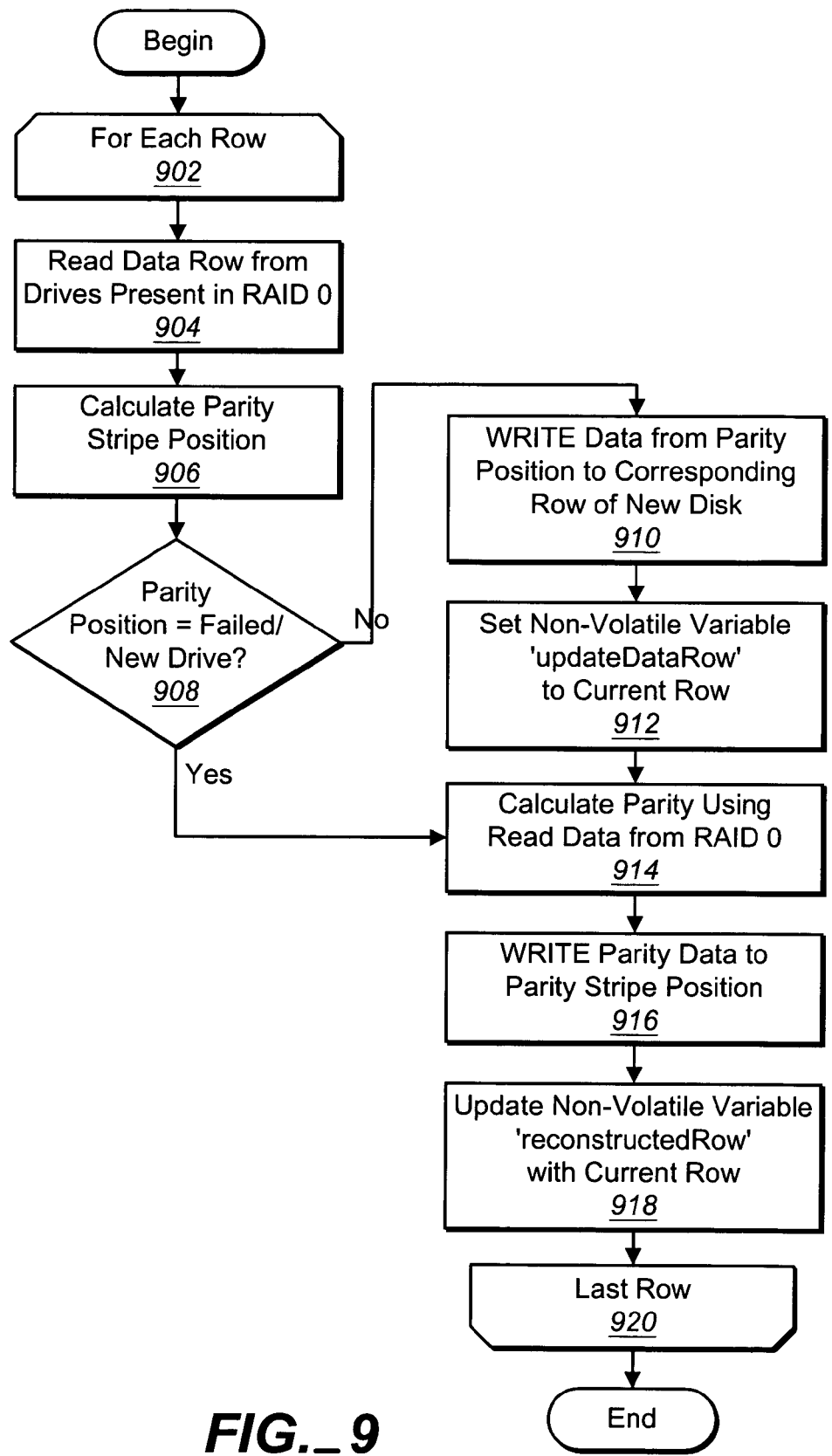
FIG._9

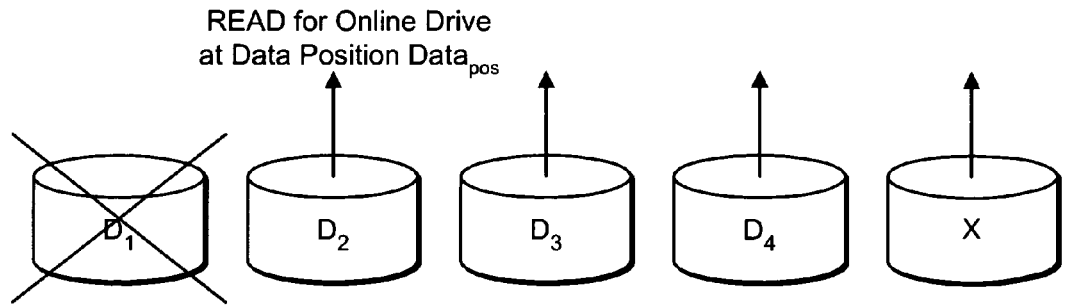
FIG._10A
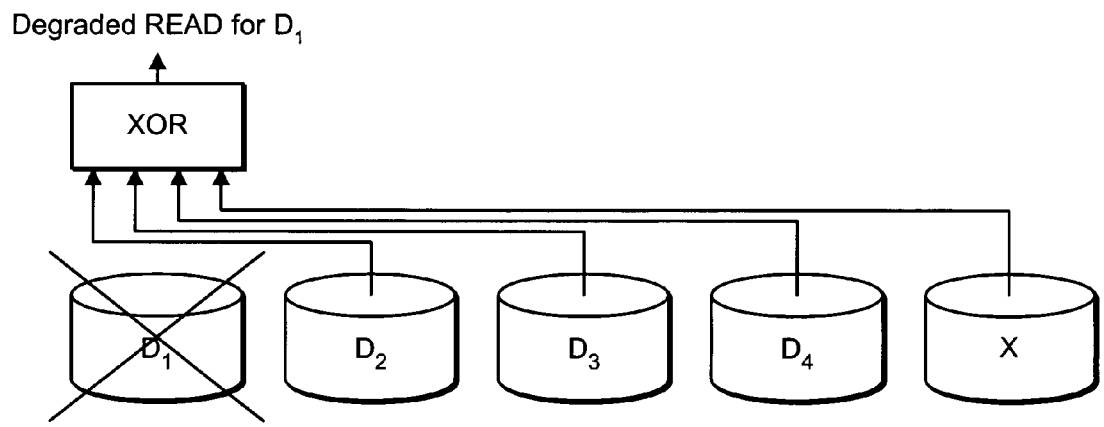
FIG._10B
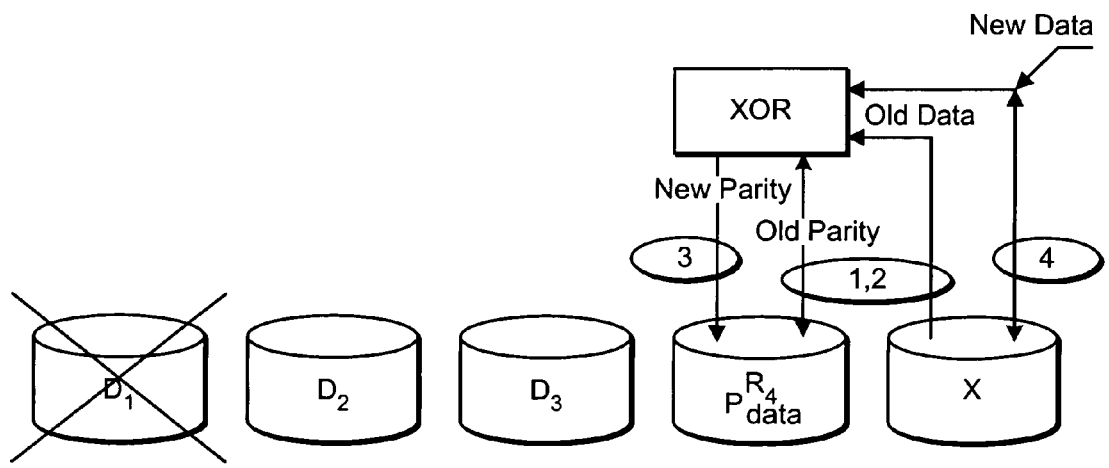
FIG._11

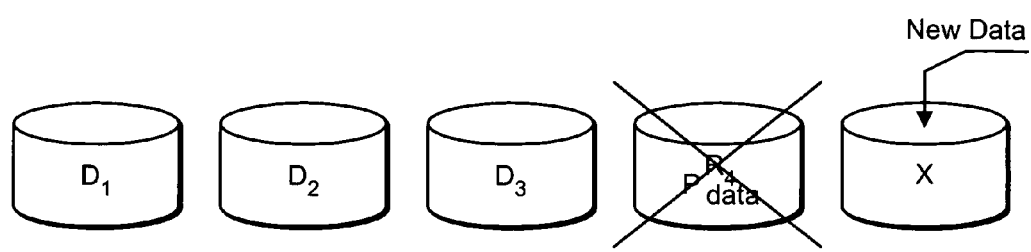
FIG._12
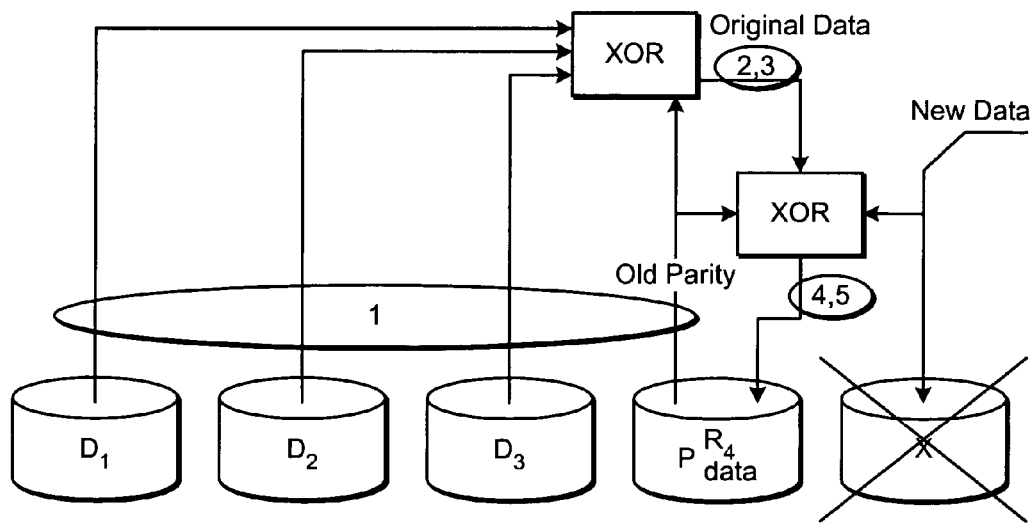
FIG._13

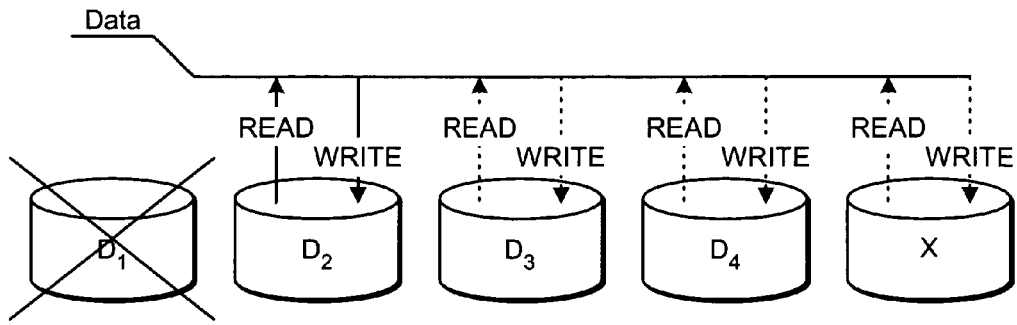
FIG._14A
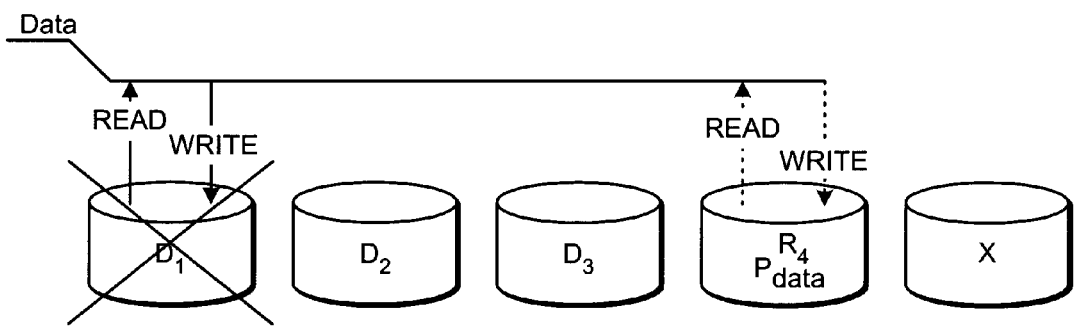
FIG._14B
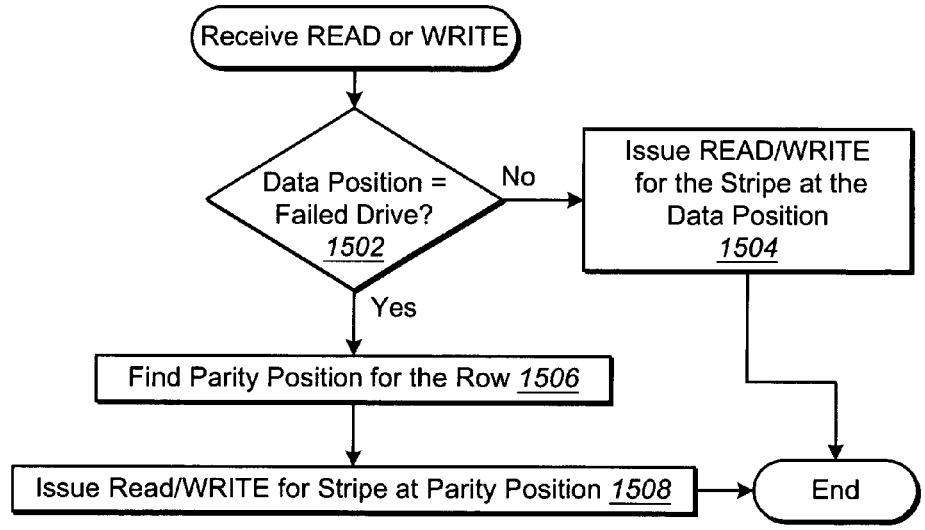
FIG._15

METHOD, APPARATUS AND PROGRAM FOR MIGRATING BETWEEN STRIPED STORAGE AND PARITY STRIPED STORAGE

BACKGROUND OF THE INVENTION

1. Technical Field

The present invention is directed generally toward storage systems and, more particularly, to a method, apparatus, and program for migrating between striped storage and parity striped storage.

2. Description of the Related Art

Redundant Array of Independent Disks (RAID) is a disk subsystem that is used to increase performance and/or provide fault tolerance. RAID is a set of two or more ordinary hard disks and a specialized disk controller that contains RAID functionality. RAID can also be implemented via software only, but with less performance, especially when rebuilding data after a failure. RAID improves performance by disk striping, which interleaves bytes or groups of bytes across multiple drives, so more than one disk is reading and writing simultaneously. Fault tolerance is achieved by mirroring or parity.

There are several levels of RAID that are common in current computer systems. RAID level 0 is disk striping only, which interleaves data across multiple disks for better performance. RAID level 1 uses disk mirroring, which provides 100% duplication of data. Offers highest reliability, but doubles storage cost. In RAID level 3, data are striped across three or more drives. This level is used to achieve the highest data transfer, because all drives operate in parallel. Parity bits are stored on separate, dedicated drives. RAID level 5 is perhaps the most widely used. Data are striped across three or more drives for performance, and parity bits are used for fault tolerance. The parity bits from all drives but one are stored on a remaining drive, which alternates among the three or more drives.

Day by day the need for data storage is increasing. This demands the addition of more drives, which leads to migration of the existing volume to a new volume. Migration is conventionally done in two ways. One-way of doing is the Online Capacity Expansion (OCE) and the other way is the RAID Level Migration (RLM). OCE can be defined as the addition of RAID capacity onto new disk drives without power-down or reboot. The existing volumes on the array will remain accessible during the expansion process. RLM allows the user to migrate a RAID volume from one RAID level to another without power-down or reboot. The volumes will remain accessible during the migration process.

Need for RLM arises from the fact that customers are demanding reliable ways to protect large volumes of data stored across an increasing number of disk drives. RAID technology allows a group of disk drives to be "tied" together to act as a single logical disk drive from the operating system perspective, providing increased performance and fault tolerance. For example, one can add a single drive to four previously existing drives, configured as RAID 0 and reconstruct these drives to RAID 5 with no data being lost or corrupted during the migration process. With RAID 1, it is expensive to create large volumes based upon the consumption of disk drives for mirroring so generally we go for RAID 5.

Therefore, it would be advantageous to provide an improved and more efficient mechanism for migrating between stripe storage and redundant parity striped storage.

SUMMARY OF THE INVENTION

The present invention provides an efficient mechanism for migration between stripe storage and redundant parity striped storage. When a disk is added to a disk array, the mechanism of the present invention migrates from RAID 0 to RAID 5. For each row, the mechanism calculates a parity stripe position, calculates a parity for the row and, if the parity position is the new drive, writes the parity to the parity stripe position. If, however, the parity position is not the new drive, the mechanism writes the data from the parity position to the new drive and writes the parity to the parity stripe position. If a drive fails, the mechanism of the present invention migrates back from RAID 5 to RAID 0. For each row, the mechanism calculates a parity stripe position and, if the parity stripe position is the failed drive, writes the failed drive data to the parity position. If, however, the parity position is not the failed drive, the mechanism reads the data from remaining drives, XORs the data stripes to get failed drive data, and writes the failed drive data to the parity position. If a read or write is received for the failed drive, the mechanism of the present invention simply redirects the read or write to the parity position.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a pictorial representation of a data processing system in which the present invention may be implemented in accordance with a preferred embodiment of the present invention;

FIG. 2 is a block diagram of a data processing system is shown in which the present invention may be implemented;

FIG. 3 is a block diagram illustrating a prior art RAID migration algorithm;

FIG. 4 is a block diagram illustrating a RAID migration algorithm in accordance with a preferred embodiment of the present invention;

FIG. 5 is a flowchart illustrating the operation of RAID migration in accordance with a preferred embodiment of the present invention;

FIGS. 6A and 6B are block diagrams illustrating reconstruction of a degraded RAID 5 volume to RAID 0 in accordance with a preferred embodiment of the present invention;

FIG. 7 is a flowchart illustrating the operation of a process of reconstructing a degraded RAID 5 volume to RAID 0 in accordance with a preferred embodiment of the present invention;

FIG. 8 is a block diagram illustrating an algorithm for reconstructing modified RAID 0 to RAID 5 in accordance with a preferred embodiment of the present invention;

FIG. 9 is a flowchart illustrating the operation of a reconstruction algorithm in accordance with a preferred embodiment of the present invention;

FIGS. 10A, 10B, and 11–13 are block diagrams illustrating access operations to degraded RAID 5 according to the prior art;

FIGS. 14A and 14B are block diagrams illustrating access operations to degraded RAID 5 in accordance with a preferred embodiment of the present invention; and FIG. 15 is a flowchart illustrating the operation of a read/write access in accordance with a preferred embodiment of the present invention.

DETAILED DESCRIPTION

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

With reference now to the figures and in particular with reference to FIG. 1, a pictorial representation of a data processing system in which the present invention may be implemented is depicted in accordance with a preferred embodiment of the present invention. A computer 102 is depicted which is connected to disk array 120 via storage adapter 110. Computer 102 may be implemented using any suitable computer, such as an IBM eServer computer or IntelliStation computer, which are products of International Business Machines Corporation, located in Armonk, N.Y.

In the depicted example, disk array 120 includes disk 0, disk 1, disk 3, and disk 4. However, more or fewer disks may be included in the disk array within the scope of the present invention. In accordance with a preferred embodiment of the present invention, a disk may be added to the disk array, such as disk X in FIG. 1. The RAID system must then migrate data to the new disk to use the disk within the array. For example, and in accordance with the exemplary aspects of the present invention, the original disk array 120 may be a RAID level 0 array. In other words, the disk array may use disk striping only, which interleaves data across multiple disks for better performance. When disk X is added to the array, the RAID system, including computer 102 and storage adapter 110, may migrate from RAID level 0 to RAID level 5 to stripe data across the drives for performance and to use parity bits for fault tolerance.

With reference now to FIG. 2, a block diagram of a data processing system is shown in which the present invention may be implemented. Data processing system 200 is an example of a computer, such as computer 102 in FIG. 1, in which storage adapter 210 implements the present invention. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards.

In the depicted example, storage adapter 210, local area network (LAN) adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. Storage adapter 210 provides a connection for hard disk drives, such as disk array 120 in FIG. 1. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as AIX, which is available from IBM Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drives, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

1. Terminology 1.1. Migration

Migration is a process of converting a RAID volume from one RAID level to another or expanding the capacity of the existing volume.

1.2. Temporary Migration Stripe

The Temporary Migration Stripe is an extra stripe, with a size same as RAID volume stripe size at the end of each disk. In the prior art, this is required to store the read data from each disk before transferring to the new RAID volume.

1.3. Temporary Migration Row

All the Temporary Migration Stripes of each disk from the current RAID volume put together is represented as single Temporary Migration Row.

2. Prior Art

The existing implementation for RLM is more complex and time consuming. A brief explanation of the present algorithm is presented taking an example. Consider a RAID 0 volume with M disks. By adding one disk to the existing M disks of RAID 0 volume we can reconstruct a RAID 5 volume of N disks, where N=M+1.

2.1. Prior Art Algorithm

FIG. 3 is a block diagram illustrating a prior art RAID migration process.

2.1.1. Migrating RAID 0 to RAID 5

Assumptions:

Let 'M' be the maximum number of disks present in RAID 0.

Number of disks that will be added to RAID 0 to migrate to RAID5 is 1.

'N' be the number of disks present in RAID 5.

Temporary Migration Stripe is available for each disk of RAID 0.

Newly added disk number is X.

Initialize the non-volatile area variable migratedRow to 0.
The non-volatile area variable may be an area in the disk itself or non-volatile read/write memory (NVRAM), for example.

'L' Maximum number of rows to be migrated.

Current row is locked for other I/O operations during migration.

Referring to FIG. 3, let $\{D_1, D_2, D_3, D_4\}$ be the 'M' disks present in RAID 0 and $\{R_1, R_2, R_3, R_4, R_5\}$ be the 'L' rows that to be migrated from RAID 0 to RAID 5. The following steps are to be performed for each row in the migration process.

For each row $\{R_1, R_2, R_3, R_4, R_5\}$

Step 1: READ the data row from 'M' drives present in RAID 0.

Step 2: WRITE the read data into the Temporary Migration Row, which includes a big "seek" to the end of the disk. The "seek" is shown in FIG. 1 as a solid line $S_1$.

Step 3: Calculate the parity stripe position $P_{pos}^R$ and data stripe positions $Data_{pos}$ for N disks of RAID 5. The formula to find the parity position is given in Section 2.2.

Step 4: Now calculate the parity $P^R$ using the read data from RAID0. The formula to find the parity is described below.

Step 5: Write the data stripes and parity in the corresponding row (say $R_1$ in our example) in N disks of RAID 5 based on the positions calculated in Step 3. During this write a seek operation is performed to the start of the row, which is shown in the FIG. 3 as a solid line $S_2$.

Step 6: Update non-volatile area variable migratedRow with current row number. This is to take care of the fault tolerance in case of power failures.

2.2. Formulae

Calculating Parity Position:

$P_{pos}^R = (R, C)$, where R is the Row and C is the disk number 'C' is defined as $C = (N - ((R) MOD(N)))$, where N is the number of disks present in RAID 5

Calculating Parity:

$$P^R = \bigoplus_{i=0}^{pos-1} (R, i) \oplus \bigoplus_{j=pos+1}^{N} (R, j),$$

where R is the Row and pos is parity position and 'N' is the number of disks present in RAID 5

Calculating Data Position (0 to M) for Each Row:
If $(D < P_{pos}^R)$ then $Data_{pos} = D$
Else $Data_{pos} = D+1$
Where D is 0 to M 2.3. Algorithmic Complexity For each row $\{R_1, R_2, R_3, R_4, R_5\}$ the read-write complexity can be calculated as follows:

In FIG. 3 consider row $R_1$ in RAID 0. The prior art algorithm must perform 'M' Reads to read M drives of RAID 0 and 'M' writes to same drives in the Temporary Migration Row to save the read data into a non-volatile area in order to take care of the power failure case along with a "big seek" $S_1$ in the drive spindle.

Calculate the parity and write back the data and parity in N drives. Again this involves big seek to the same row where the data has been read.

To migrate each row involves 'M' Reads, '2M+1' writes and M-1 exclusive OR (XOR) operations with two geeks in the drive.

As 'M' increases, for each row to migrate the prior art migration process will take more processing time and bandwidth. If migration occurs during I/O, the performance decreases.

3. Efficient RLM Algorithms

Consider the same RAID 0 volume with M disks as that is taken in the Prior Art algorithm. By adding one disk to the existing M disks of RAID 0 volume the RAID migration algorithm of the present invention may reconstruct a RAID 5 volume of N disks, where N=M+1. FIG. 4 is a block diagram illustrating a RAID migration algorithm in accordance with a preferred embodiment of the present invention.

3.1. Migrating RAID 0 to RAID 5

The following steps are performed to reconstruct a RAID 5 volume from RAID 0 volume using the new RLM algorithm.

Assumptions:

Let 'M' be the maximum number of disks present in RAID 0.

Number of disks that will be added to RAID 0 to migrate to RAID 5 is 1.

'N' be the number of disks present in RAID 5 (N=M+1).

Newly added disk number is X

Initialize the Non-Volatile area variables migratedRow and dataMigratedFlag to 0. The non-volatile area may be an area in the disk itself or NVRAM.

'L' Maximum number of rows to be migrated

Current row is locked for other I/O operations during migration

Referring to FIG. 4, let $\{D_1, D_2, D_3, D_4\}$ be the 'M' disks present in RAID 0 and $\{R_1, R_2, R_3, R_4, R_5\}$ be the 'L' rows that to be migrated from RAID 0 to RAID 5.

With reference now to FIG. 5, a flowchart is shown illustrating the operation of RAID migration in accordance with a preferred embodiment of the present invention. The process begins and for each row, $\{R_1, R_2, R_3, R_4, R_5\}$ in the example shown in FIG. 4 (step 502), the process reads the data row from 'M' drives present in RAID 0 (step 504) and calculates the parity stripe position $P_{pos}^R$ (step 506). The formula to find the parity position and data position is discussed below. Then, the process calculates the parity $P^R$ using the read data from RAID0 (step 508). The formula to calculate the parity is given below.

Next, a determination is made as to whether the calculated parity stripe position $P_{pos}^R$ falls in newly added disk X(step 510). If the calculated parity stripe position $P_{pos}^R$ falls other than disk X, which is a part of RAID0, the process writes the data stripe read from the position $P_{pos}^R$ into the newly added disk X of the corresponding row, $R_1$ in the depicted example (step 512). Then the process sets the non-volatile variable flag dataMigratedFlag as TRUE to indicate completion of data migration to the new volume (step 514). Following step 514 or a determination that the parity position falls in the newly added disk in step 510, the process writes the parity into the parity stripe position $P_{pos}^R$ (step 516). Thereafter, the process updates non-volatile variable migratedRow with the current row number to take care of the fault tolerance in case of power failures (step 518) and resets the non-volatile variable flag dataMigratedFlag to FALSE (step 520). The process repeats until the last row is reached (step 522) and the process ends.

3.2. Formulae

Calculating Parity Position:

$P_{pos}^R = (R, C)$, where R is the Row and C is the disk number 'C' is defined as $C = (N - ((R) MOD(N)))$, where N is the number of disks present in RAID 5

Calculating Parity:

$$P^R = \bigoplus_{i=0}^{pos-1}(R, i) \oplus \bigoplus_{j=pos+1}^{N}(R, j),$$

where R is the Row and pos is parity position and 'N' is the number of disks present in RAID 5

Calculating Data Position (0 to M) for Each Row:

If $(D \neq P_{pos}^R)$ then $Data_{pos} = D$

Else $Data_{pos} = X$, where X is the newly added disk

Where D is 0 to M

3.3. Algorithmic Complexity

For each row $\{R_1, R_2, R_3, R_4, R_5\}$ the read-write complexity of the new RLM algorithm can be calculated as follows:

In FIG. 4 consider row $R_1$ in RAID 0. The algorithm of the present invention performs 'M' Reads to read M drives of RAID 0 and we need to perform (M−1) XOR operations to calculate the parity.

The process of migration from RAID 0 to RAID 5, in accordance with the exemplary aspects of the present invention, needs to update only the parity position and the newly inserted drive data stripe. All other stripes remain the same. Therefore, only two write operations are required per row in the algorithm of the present invention.

To migrate each row, the process of the present invention involves 'M' Reads, one write for the first row in each 'M' rows or two writes for the remaining M−1 rows and M−1 XOR operations.

In the algorithm of the present invention, there is no need to make a copy of the existing data to the same drives and, hence, the two time consuming "Big Seeks" per row are avoided. Also, for any row there will be maximum two writes. Compared to the prior art algorithm, the number of writes is drastically reduced.

As 'M' increases, the number of writes remains the same. The processing time and bandwidth is drastically reduced when compared to the prior art algorithm.

If migration occurs during I/O, the performance is not affected when compared to the prior art algorithm.

4. An Efficient Way of Handling Degraded RAID 5

In RAID 0, I/O performance is always better than degraded RAID 5, because there are no XOR operations. Therefore, it is better to reconstruct the degraded RAID 5 volume to RAID 0 volume. FIGS. 6A and 6B are block diagrams illustrating reconstruction of a degraded RAID 5 volume to RAID 0 in accordance with a preferred embodiment of the present invention.

4.1. Algorithm for Reconstruction of Degraded RAID 5 to RAID 0

It is required to keep the old RAID 5 configuration if the failed drive of the degraded RAID 5 is other than last drive of the logical array. FIG. 6A shows a degraded RAID 5 with the last drive failed. Referring to FIG. 6A, we see that $\{D_1, D_2, D_3, D_4\}$ are the online drives and $\{Z\}$ is the failed drive of the total 'N' disks present in the degraded RAID 5. The reconstruction mechanism of the present invention converts the degraded RAID 5 to RAID 0 by replacing the parity stripes of the degraded RAID 5 with the data stripes of the failed disk $\{Z\}$.

FIG. 6B shows a degraded RAID 5 with the drive failed other than the last drive. Referring to FIG. 6B, $\{D_1, D_2, D_4, X\}$ are the online drives and $\{D_3\}$, represented as $\{Z\}$, is the failed drive of the total 'N' disks present in the degraded RAID 5. The reconstruction mechanism of the present invention converts the degraded RAID 5 to RAID 0 by replacing the parity stripes of the degraded RAID 5 with the data stripes of the failed disk $\{Z\}$.

Assumptions:

Let 'N' be the number of disks present in RAID 5.

Let 'M' be the maximum number of disks present in RAID 0.

Let the failed disk number be Z (refer to FIG. 6B).

Initialize the non-volatile area variable reconstructedRow and savedStripe equal to 0. The non-volatile area may be an area in the disk itself or NVRAM.

TemporaryStripe as an extra stripe, having a size that is same as the RAID volume stripe size, at the end of the disk (Drive X) to store calculated failed drive data before transferring to the actual data drive.

Current row is locked for other I/O operations during reconstruction.

FIG. 7 is a flowchart illustrating the operation of a process of reconstructing a degraded RAID 5 volume to RAID 0 in accordance with a preferred embodiment of the present invention. The process begins and, for each row $\{R_1, R_2, R_3, R_4, R_5\}$ (step 702), the process parity stripe position $P_{pos}^R$ for N disks of RAID 5 (step 704). Then, a determination is made as to whether $P_{pos}^R$ falls in failed drive Z (step 706).

If the parity position does not fall in the failed drive, the process reads the data row from M drives present in the degraded RAID 5 (step 708), XORs the data stripes with parity stripe to get the failed drive data (step 710), and saves the failed drive data in the TemporaryStripe (step 712). Following step 712 or a determination that the parity position falls in the failed drive in step 706, the process update non-volatile variable savedStripe with current ROW number to take care of the fault tolerance in case of power failures (step 714). Thereafter, the process writes the failed drive data in the parity position $P_{pos}^R$ (step 716) and updates non-volatile variable reconstructedRow with current ROW number to take care of the fault tolerance in case of power failures (step 718). The process repeats until the last row is reached (step 720) and the process ends.

RAID 0 in FIG. 6B represents the reconstructed RAID 0 from degraded RAID5 after following the process illustrated in FIG. 7. If power failure occurs after step 714, there will be a difference between savedStripe and reconstructedRow variables. Therefore, the present invention reads the data from the TemporaryStripe and performs the following steps 716 and 718 for that row savedStripe. In all other cases, the process must start from step 712 for the row value reconstructedRow+1.

4.1.1. Stripe Mapping for Reconstructed RAID 0

The reconstructed RAID 0 stripe mapping is slightly different from the normal RAID 0 mapping if the failed drive in the original RAID 5 configuration is other than last drive of the logical array. In that case, the mechanism of the present invention must remember the original RAID 5 configuration. The reconstructed RAID 0 gives much better read/write performance than degraded RAID 5. The complexity of degraded RAID 5 is reduced drastically in case of reconstructed RAID 0.

4.1.2. Reconstruction of Modified RAID 0 to RAID 5

The present invention also may reconstruct modified RAID 0 to RAID 5. If the failed drive in the original RAID 5 configuration was the last drive, then reconstructed RAID 0 is the same as original RAID 0. The RAID5 reconstruction algorithm described above with reference to FIG. 5 may be used. FIG. 8 is a block diagram illustrating an algorithm for reconstructing modified RAID 0 to RAID 5 in accordance with a preferred embodiment of the present invention.

If the failed drive was other than last drive then, the below algorithm must be used to reconstruct a RAID 5 volume from modified RAID 0 volume.

Assumptions:
Let 'M' be the Maximum number of disks present in RAID 0.
Number of disks that will be added to RAID 0 to migrate to RAID5 is 1.
'N' be the number of disks present in RAID 5 (N=M+1).
Newly added disk number is X1.
Assume the failed drive was D3. Map D3 to X1.
Initialize the Non-Volatile area variables reconstructedRow and updatedDataRow to 0. The non-volatile area may be an area in the disk itself or NVRAM.
'L' is the maximum number of rows to be migrated.
Current row is locked for other I/O operations during reconstruction.

Referring to FIG. 8, let $\{D_1, D_2, D_4, X\}$ be the 'M' disks present in RAID 0 and $\{R_1, R_2, R_3, R_4, R_5\}$ be the 'L' rows that to be migrated from RAID 0 to RAID 5. FIG. 9 flowchart illustrating the operation of a reconstruction algorithm in accordance with a preferred embodiment of the present invention. The process begins and, for each row $\{R_1, R_2, R_3, R_4, R_5\}$ (step 902), the process reads the data row from 'M' drives present in RAID 0 (step 904) and calculates the parity stripe position $P_{pos}^R$ (step 906). The formula to find the parity position and data position is below.

Next, a determination is made as to whether the calculated parity stripe position $P_{pos}^R$ falls in disk D3 (X1) (step 908). If the calculated parity position does not fall in the failed drive position, the process writes the data read from $P_{pos}^R$ into disk D3 of the corresponding row, which is $R_1$ in the example shown in FIG. 8 (step 910). Then, the process sets the non-volatile variable updatedDataRow to the current row value to indicate the completion of data transferred to the disk D3 to take care of the fault tolerance in case of power failures (step 912).

Following step 912 or a determination that the parity position falls in the failed drive position in step 908, the process calculates the parity $P^R$ using the read data from RAID0 (step 914). The formula to calculate the parity is given in below. Then, the process writes the parity into the parity stripe position $P_{pos}^R$ (step 916) and updates non-volatile variable reconstructedRow with current row number to take care of the fault tolerance in case of power failures (step 918).

If power failure occurs when power comes up and the updatedDataRow value is more than reconstructedRow, then data has been transferred successfully to drive D3. Therefore, the process performs steps 904 and 906 and continues to 914 for the row value in updatedDataRow. For all other cases, the process starts from step 904 for the row value in 'reconstructedRow+1'.

4.2 Accessing Degraded RAID 5 in the Prior Art

Using the prior art algorithm, a read operation to the degraded RAID 5 is performed in two different methods. If the read operation is for an online drive at the data stripe position $Data_{pos}$, the read may be issued directly to that stripe at data stripe position $Data_{pos}$, which is shown in the FIG. 10A. If the read operation is for a failed drive, such as $D_1$ shown in FIG. 10B the prior art algorithm must calculate the parity position, read the data stripes and parity stripe, XOR the data stripes with parity stripe to get the original data that was present in the drive $D_1$.

If a write to the degraded RAID 5 is received, the prior art algorithm must perform a write operation based on the drive to which the write has come. Using the prior art algorithm, a write operation to the degraded RAID 5 is performed. For any write, the algorithm first finds the data stripe position $Data_{pos}$ to be written.

CASE 1:
If the data stripe position $Data_{pos}$ falls in the online drive say X, and parity position $P_{pos}^R$ also falls in one of the online drives say $P_{data}^{R4}$ as shown in FIG. 11, then do the following:
1. Read the data from $Data_{pos}$ and parity from $P_{pos}^R$.
2. Remove the current data $Data_{data}$ information from the $P_{data}^R$. Use the formula $P_{tempdata}^R = P_{data}^R \oplus Data_{data}$ for removing the data Datadata from $P_{pos}^R$.
3. Update the parity with new data that has to be written in $Data_{pos}$ using the formula $P_{newdata}^R = P_{tempdata}^R \oplus Data_{newdata}$.
4. Write $Data_{newdata}$ in $Data_{pos}$ and $P_{newdata}^R$ in $P_{pos}^R$.

CASE 2:
If the stripe position $Data_{pos}$ falls in the online drive say X and parity position $P_{pos}^R$ falls in the failed drive say $P_{pos}^{R4}$ as shown in the FIG. 12, then the prior art algorithm directly issues a write to the stripe at data position $Data_{pos}$ to the drive X.

CASE 3:
If the stripe position $Data_{pos}$ falls in the failed drive and parity position $P_{pos}^R$ falls in an online drives say $P_{data}^{R4}$ as shown in FIG. 13 then the prior art algorithm performs the following:
1. Issue M reads to the M drives present in the RAID volume.
2. XOR the data stripes with parity stripe to get the original data. $(Data_{data} = P_{data}^R \oplus (Data_{data1} \oplus Data_{data2} \oplus \ldots))$.
3. Remove the current data $Data_{data}$ information from the parity. $P_{tempdata}^R = P_{data}^R \oplus Data_{data}$.
4. Update the parity with new data $Data_{newdata}$, which has to be written in stripe position $Data_{pos}$. $(P_{newdata}^R = P_{tempdata}^R \oplus Data_{newdata})$.
5. Write the parity information $P_{newdata}^R$ in $P_{pos}^R$.

4.3. Accessing Degraded RAID 5 Using the Method of the Present Invention

In case of the degraded RAID 5, the algorithm of the present invention reconstructs RAID 0 from the degraded RAID 5. Whether an access is a read or write, the algorithm becomes much more simple than the prior art algorithm. For any read or write that comes to an online drive, for example $\{D_2, D_3, D_4, X\}$ shown in the FIG. 14A, the data stripe position $Data_{pos}$ falls in the drives present in the reconstructed RAID 0. In this case the algorithm of the present invention first finds the corresponding data stripe position $Data_{pos}$ and then issues the read/write for the stripe at data position $Data_{pos}$.

For any read or write that comes to the failed drive, for example $\{D_1\}$ shown in the FIG. 14B, the algorithm of the present invention finds the parity position $P_{pos}^R$ for that row and issues the read/write for the stripe at parity position $P_{pos}^R$. Therefore, the number of reads and writes are less than those of the prior art and also no XOR operations are needed when accessing degraded RAID 5.

FIG. 15 is a flowchart illustrating the operation of a read/write access in accordance with a preferred embodiment of the present invention. The process begins by receiving a read or write access request for a drive. A determination is made as to whether the data position of the request is the failed drive (step 1502). If the data position is not the failed drive, the process issues the read/write for the stripe at the data position (step 1504) and ends. However, if the data position is the failed drive in step 1502, the process finds the parity position for the row (step 1506) and issues the read/write for the stripe at the parity position (step 1508). Thereafter the process ends.

4.4. Handling Fault Tolerance

There are two types of faults that needs to be taken care of.

In case of power failure during the RLM process:
In the old algorithm,
The original data already stored in the Temporary Migration Row is used to reconstruct the new RAID 5 volume. To find the row that has to be migrated, the non-volatile variable migrated row, which has information about the row that has already been migrated, is used.
In the new algorithm,
The NVRAM dataMigratedFlag indicates if the data corresponding to the current row (migratedRow+1) is migrated or not. If the flag is set, then only parity has to be calculated and needs to be updated. Otherwise, the flag implies that the migration has been done to the 'migratedRow' row and has to be started with next row.
In case of drive failure after RLM:
In the old algorithm,
For any read that falls on the data stripe of the failed drive, the entire row should be read and the entire data stripe should be XORed with the parity stripe to get the correct data.
In case of a write,
  i) Get the old data by doing XOR on the other data stripes with parity stripe.
  ii) Remove the old data information from the parity data (XOR the parity with old data and update the parity).
  iii) Calculate the parity (XOR the new data with current parity) and write into parity stripe.
In the new algorithm,
The new fault tolerance algorithm always reconstructs the degraded RAID 5 volume to RAID 0. Since RAID 0 is always faster than degraded RAID 5, I/Os are much faster when compared to the prior art algorithm. Also, reconstructing this RAID 0 to RAID 5 is done much more efficiently as the algorithm always knows the previous RAID 5 configuration.

5. Complexity Comparison

To migrate RAID 0 to RAID 5 in case of the prior art algorithm, for each row it requires M reads (M is the number of disks present in the RAID 0) and 2M+1 writes. Also, the prior art algorithm involves a 'big seek' in the drives (drive spindle moving from current ROW to Temporary Migration Row and back to save the data), which is a time consuming operation.

In the case of the algorithm of the present invention, for each row only M reads and maximum 2 writes are needed. The present invention does not require any big seek, since there is no need for saving the data in the Temporary Migration Row. Therefore, the algorithm of the present invention requires only M reads and maximum two writes. This algorithm reduces 2M−1 writes and the 'big seek' involving the drives for each row. The present invention also reduces the processing time and bandwidth. The performance increases drastically when I/O and migration are occurring simultaneously. In addition, in case of any drive failure, the algorithm of the present invention performs more efficiently, as it reconstructs the degraded RAID 5 to RAID 0. Since RAID 0 always performs much better than degraded RAID 5, the algorithm of the present invention is efficient even in the case drive failure.

6. Advantages

The RAID Level Migration process becomes very fast, because of the reduced write operations (i.e., always maximum two write operations irrespective of any number of drives present in the RAID volume). As the number of disks increases in RAID 0, the performance also increases during the migration process. In case of a drive failure, the algorithm of the present invention reconstructs the entire RAID 0 volume from the degraded RAID 5. The complexity of reconstructed RAID 0 is reduced compared to the degraded RAID 5. Hence, the reconstructed RAID 0 gives much better performance than degraded RAID 5. Power failure during the RAID volume migration process is taken care in a very efficient way by simply using a non-volatile variable instead of using a Temporary Migration Row, as in the prior art. By not using the Temporary Migration Row, the present invention saves M writes per row, where M is the number of disks present in the RAID 0. The algorithm of the present invention performs better by avoiding the 'big seek' during the migration process, because the present invention does not use the Temporary Migration Row.

7. Conclusion

Over the years, RAID technology has gathered momentum and has become de-facto storage paradigm for servers. With the advancement of technology, storage administrators are implementing redundant storage pools with bigger, faster, and more drives. To keep the cost per MB capacity of storage low, there is a big push for going towards RAID 5 instead of RAID 1 or RAID 10. This works very well for most server applications, though there is some write penalty that has to be paid for random writes. This, however, is quantified and controlled irrespective of the size of the RAID Array. In the worst case, in read-modify-write updates, one block write may at most result in two reads and two writes. The problem, however, occurs in the event of a drive dropping out. In this situation, if the array is large, then even for reads that map into the failed drive, the algorithm must read all the other (N−1) Drives and do a large XOR to re-compute the lost data. Also, for writes, more I/Os may be required. The present invention dramatically reduces this by allowing to quickly migrate non-redundant RAID 5 to RAID 0, and then, when a new drive becomes available, it will allow the conversion into fully redundant RAID 5. This new striping for RAID 5 has all the merits of ensuring performance and redundancy by striping data and rotating parity. Yet, data is striped so as not to sacrifice any merits for performance and redundancy and yet to allow quick migration from redundant to non-redundant RAID levels.

What is claimed is:

1. A method for migrating from a non-mirrored, striped storage array that does not use parity to a parity striped storage array, the method comprising:

adding an additional new functioning drive to existing functioning drives of the non-mirrored, striped storage array to form the parity striped storage array;

for each row in the parity striped storage array, performing the following steps:
  reading data from the existing drives;
  calculating a parity stripe position for the row;
  calculating a parity for the row;
  determining whether the parity stripe position is in one of the existing drives;
  responsive to determining that the parity stripe position is in one of the existing drives:
    writing data from the one of the existing drives that includes the parity stripe position to the new drive; and
    writing the parity to the one of the existing drives that includes the parity stripe position.

2. The method of claim 1, wherein the parity stripe position for the row is calculated using the following equation:

$$P_{pos}^R = (R, C),$$

where R is the row and C is the drive number corresponding to the parity stripe position, where C is defined as $$C = (N - ((R) \mathrm{MOD}(N))),$$

where N is a number of drives in the parity striped storage array.

3. The method of claim 2, further comprising:
responsive to a drive within the parity striped storage array failing to form a degraded parity striped storage array, restoring a modified non-mirrored striped storage array that does not use parity from the degraded parity striped storage array.

4. The method of claim 3, wherein restoring a modified non-mirrored striped storage array that does not use parity from the degraded parity striped storage array includes:
for each row in the parity striped storage array, performing the following steps:
  calculating a parity stripe position for the row;
  determining whether a drive of the parity striped storage array corresponding to the parity stripe position is the failed drive;
  responsive to the drive corresponding to the parity stripe position not being the failed drive, reading data from the row, and determining failed drive data for the row; and
  writing the failed drive data to the drive corresponding to the parity stripe position.

5. The method of claim 1, wherein the parity for the row is calculated using the following equation:

$$P^R = \bigoplus_{i=0}^{pos-1} (R, i) \oplus \bigoplus_{j=pos+1}^{N} (R, j),$$

where R is the row and pos is the parity stripe position and N is the number of drives in the parity striped storage array.

6. A method for restoring a modified non-mirrored striped storage array that does not use parity from a degraded parity striped storage array by removing a failed drive from the degraded parity striped storage array to form the modified, non-mirrored striped storage array, the method comprising:

for each row in the degraded parity striped storage array, performing the following steps:
  calculating a parity stripe position for the row;
  determining whether the parity stripe position is in the failed drive;
  responsive to the parity stripe position not being in the failed drive, reading data from the row and using the data to determine failed drive data for the row;
  writing the failed drive data to a drive that includes the parity stripe position; and
wherein the modified, non-mirrored striped storage array is formed after failed drive data is written into the parity stripe position for each row.

7. The method of claim 6, wherein the step of determining failed drive data for the row includes performing an exclusive OR operation on remaining stripes and a parity stripe to form failed drive data.

8. The method of claim 6, further comprising:
receiving an access request for a drive of the modified non-mirrored striped storage array;
determining whether a data position of the request corresponds to the failed drive;
responsive to the data position being the failed drive, determining a parity stripe position for the row and issuing the access request to a drive of the modified non-mirrored striped storage array corresponding to the parity stripe position.

9. The method of claim 6, further comprising migrating from the modified non-mirrored striped storage array to a parity striped storage array including adding an additional new functioning drive to existing functioning drives of the modified non-mirrored striped storage array to form the parity striped storage array.

10. The method of claim 9, further comprising:
for each row in the parity striped storage array, performing the following steps:
  reading data from the existing drives;
  calculating a parity stripe position for the row;
  calculating a parity for the row;
  determining whether the parity stripe position is in one of the existing drives;
  responsive to determining that the parity stripe position is in one of the existing drives:
    writing data from the one of the existing drives that includes the parity stripe; position to the new drive; and
    writing the parity to the one of the existing drives that includes the parity stripe position.

11. A data processing system, comprising:
a host;
a storage adapter; and
a non-mirrored striped storage array that does not use parity, wherein the host is connected to the non-mirrored striped storage array using the storage adapter,
wherein the host migrates to a parity striped storage array from the non-mirrored striped storage array by performing the following:
  adding an additional new functioning drive to existing functioning drives of the non-mirrored, striped storage array to form the parity striped storage array;
  for each row in the parity striped storage array, performing the following steps:
    reading data from the existing drives;
    calculating a parity stripe position for the row;
    calculating a parity for the row;
    determining whether the parity stripe position is in one of the existing drives;

responsive to determining that the parity stripe position is in one of the existing drives:
  writing data from the one of the existing drives that includes the parity stripe position to the new drive; and
  writing the parity to the one of the existing drives that includes the parity stripe position.

12. The data processing system of claim 11, wherein the parity stripe position for the row is calculated using the following equation:

$$P_{pos}^R = (R, C),$$

where R is the row and C is the drive number corresponding to the parity stripe position, where C is defined as $$C = (N - ((R) \text{MOD}(N))),$$

where N is a number of drives in the parity striped storage array.

13. The data processing system of claim 11, wherein the parity for the row is calculated using the following equation:

$$P^R = \bigoplus_{i=0}^{pos-1} (R, i) \oplus \bigoplus_{j=pos+1}^{N} (R, j),$$

where R is the row and pos is the parity stripe position and N is the number of drives in the parity striped storage array.

14. The data processing system of claim 11, wherein the host restores a non-mirrored modified striped storage array that does not use parity from the degraded parity striped storage array responsive to a drive within the parity striped storage array failing to form a degraded parity striped storage array.

15. The data processing system of claim 14, wherein the host restores the modified non-mirrored striped storage array from the degraded parity striped storage array by performing the following:
  for each row in the parity striped storage array, performing the following steps:
    calculating a parity stripe position for the row;
    determining whether a drive of the parity striped storage array corresponding to the parity stripe position is the failed drive;
    responsive to the drive corresponding to the parity stripe position not being the failed drive, reading data from the row, and determining failed drive data for the row; and
    writing the failed drive data to the drive corresponding to the parity stripe position.

16. A data processing system, comprising:
  a host;
  a storage adapter; and
  a degraded parity striped storage array, wherein the host is connected to the striped storage array using the storage adapter,
  wherein the host restores a modified non-mirrored striped storage array that does not use parity from the degraded parity striped storage array, by removing a failed drive from the degraded parity striped storage array to form the modified, non-mirrored striped storage array, by performing the following:
  for each row in the degraded parity striped storage array, performing the following steps:
    calculating a parity stripe position for the row;
    determining whether the parity stripe position is in the failed drive;
    response to the parity stripe position not being in the failed drive, reading data from the row and using the data to determine failed drive data for the row;
    writing the failed drive data to a drive that includes the parity stripe position; and
  wherein the modified, non-mirrored striped storage array is formed after failed drive data is written into the parity stripe position for each row.

17. The data processing system of claim 16, wherein determining failed drive data for the row includes performing an exclusive OR operation on remaining stripes and a parity stripe to form failed drive data.

18. The data processing system of claim 16, wherein the storage adapter receives an access request for a drive of the modified non-mirrored striped storage array, determines whether a data position of the request corresponds to the failed drive, and, responsive to the data position being the failed drive, determines a parity stripe position for the row and issues the access request to a drive of the modified non-mirrored striped storage array corresponding to the parity stripe position.

19. The data processing system of claim 16, wherein the host migrates from the modified non-mirrored striped storage array to a parity striped storage array including adding an additional new functioning drive to existing functioning drives of the modified non-mirrored striped storage array to form the parity striped storage array.

20. The data processing system of claim 19, further comprising:
  for each row in the parity striped storage array, performing the following steps:
    reading data from the existing drives;
    calculating a parity stripe position for the row;
    calculating a parity for the row;
    determining whether the parity stripe position is in one of the existing drives;
    responsive to determining that the parity stripe position is in one of the existing drives:
      writing data from the one of the existing drives that includes the parity stripe position to the new drive; and
      writing the parity to the one of the existing drives that includes the parity stripe position.

21. A computer readable medium having a computer program product for migrating from a non-mirrored striped storage array that does not use parity to a parity striped storage array, an additional new functioning drive being added to existing functioning drives of the non-mirrored striped storage array to form the parity striped storage array, the computer program product comprising:
  instructions for performing the following steps for each row in the parity striped storage array:
    reading data from the existing drives;
    calculating a parity stripe position for the row;
    calculating a parity for the row;
    determining whether the parity stripe position is in one of the existing drives;
    responsive to determining that the parity stripe position is in one of the existing drives;
      writing data from the one of the existing drives that includes the parity stripe position to the new drive; and
      writing the parity to the one of the existing drives that includes the parity stripe position.

22. A computer readable medium having a computer program product for restoring a modified non-mirrored striped storage array that does not use parity from a degraded parity striped storage array by removing a failed drive from the degraded parity striped storage array to form the modified, non-mirrored striped storage array, the computer program product comprising:

instructions for performing the following steps for each row in the degraded parity striped storage array:

calculating a parity stripe position for the row;

determining whether the parity stripe position is in the failed drive;

responsive to the parity stripe position not being in the failed drive, reading data from the row and using the data to determine failed drive data for the row;

writing the failed drive data to a drive that included the parity stripe position; and wherein the modified, non-mirrored striped storage array is formed after failed drive data is written into the parity stripe position for each row.

* * * * *